July 9, 1946. A. V. LOUGHREN 2,403,728
SYSTEM FOR INDICATING THE POSITION IN SPACE OF AN OBJECT
Filed Nov. 28, 1941
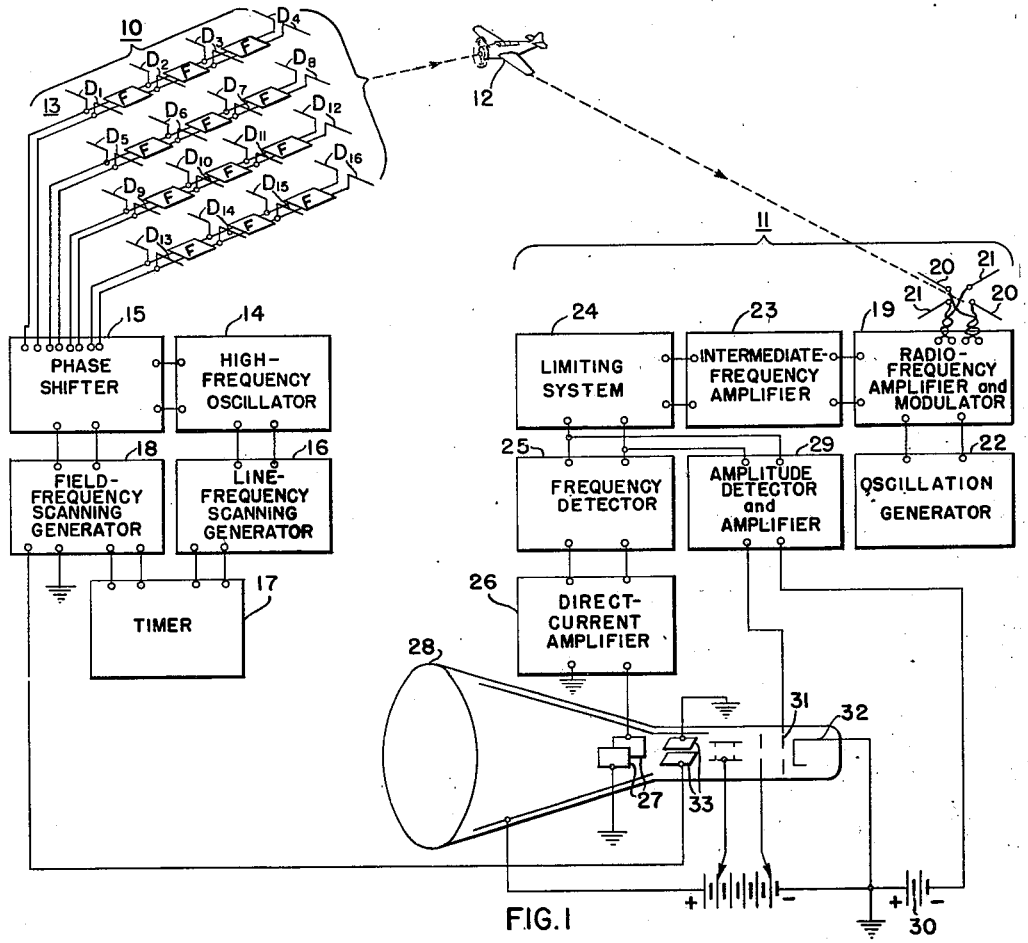
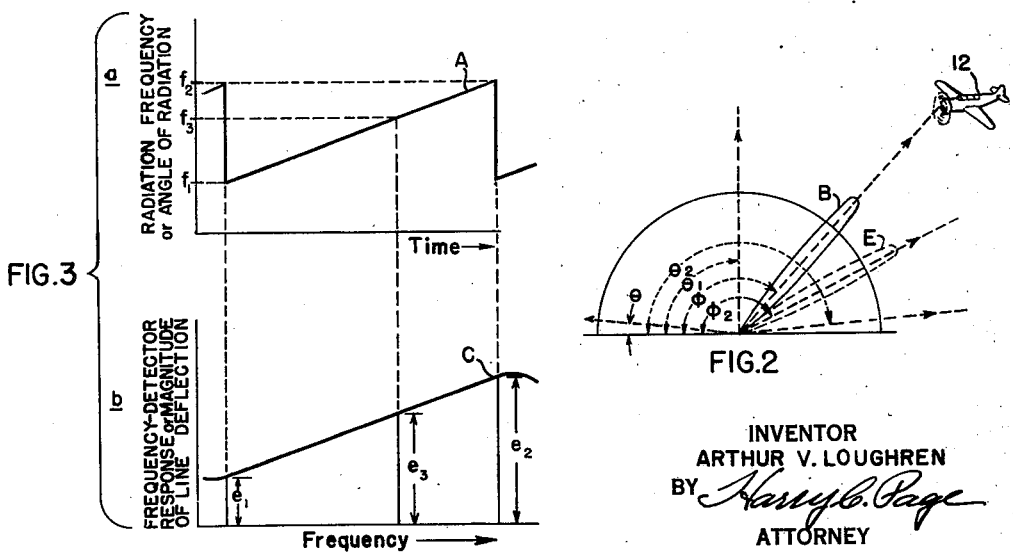
INVENTOR
ARTHUR V. LOUGHREN
BY
ATTORNEY

Patented July 9, 1946

2,403,728

UNITED STATES PATENT OFFICE 2,403,728

SYSTEM FOR INDICATING THE POSITION IN SPACE OF AN OBJECT

Arthur V. Loughren, Great Neck, N. Y., assignor, by mesne assignments, to Hazeltine Research, Inc., Chicago, Ill., a corporation of Illinois Application November 28, 1941, Serial No. 420,772

8 Claims. (Cl. 250—11)

The present invention relates to systems for indicating the position in space of a radiated-signal reflector and, while the invention is of general application, it is of particular utility in systems for locating aircraft in flight.

It has been proposed in applicant's copending application Serial No. 395,172, filed May 26, 1941, entitled "System for space-scanning with a radiated beam of wave signals" that the position of a radiated-signal reflector in space be determined by cyclically scanning with a sharply-concentrated radiated beam a predetermined space which includes the reflector, at a relatively high frequency in one direction and at a relatively low frequency in a direction normal to the one direction. Radiated carrier-signal energy is reflected from the reflector, is received, and is used to modulate the intensity of the cathode-ray beam of a cathode-ray tube type of indicator. The cathode-ray beam of the tube is caused to scan the fluorescent screen thereof in two directions normal to each other in synchronism with the cyclic scanning of the space by the radiated beam. The position in space of the reflector is thus indicated by an illuminated spot produced on the screen of the cathode-ray tube. However, in such systems, the time required for the radiated carrier signal to travel from the point of radiation to the reflector and back to the point of reception is a finite value which, at the high scanning frequencies employed, must be compensated for to avoid error in the position indication thus provided. There is, consequently, derived in the system of the aforementioned application a unidirectional potential of pulse wave form and of amplitude varying with the time interval required for the radiated carrier signal to travel to and from the reflector, and this derived potential is used to modify the high-frequency scanning of the cathode-ray tube. While the compensation thus provided is entirely adequate over the central portion of the scanned area, it is somewhat limited in its accuracy around the outer portions of the scanned area due to the fact that a compensating potential pulse which actually should compensate during a given line deflection of the cathode-ray beam may occur subsequent to the start of a new scanning line. It is desirable, however, that the accuracy of the indications provided by a system of this type be entirely independent of any time delays involved between the radiation and reception of the radiated carrier signal.

It is an object of the present invention, therefore, to provide a new and improved system for indicating the position in space from a locating station of a radiated-signal reflector, such as an aircraft.

It is a further object of the invention to provide a system for indicating the position in space of a radiated-signal reflector and one in which the time interval required for the radiated carrier signal to travel to the reflector and to return to the point of reception requires no compensation in effecting the desired position indication.

In accordance with the invention, a system for locating a radiated-signal reflector comprises an antenna system having a radiation characteristic effectively in the form of a sharply-concentrated beam, means for applying a carrier signal to the antenna system, and means for varying the frequency of the carrier signal and for scanning a predetermined space in at least one direction with the beam synchronously with the frequency variation. The system also includes means for receiving carrier-signal energy from the radiated beam reflected from the reflector, means responsive solely to the received carrier-signal energy for deriving therefrom a control signal a characteristic of which varies with the frequency of the received carrier-signal energy, and means responsive to the control signal and dependent upon the above-mentioned characteristic thereof for indicating the position in space of the reflector.

In a particular form of the invention, a system of the type described includes a cathode-ray tube and means responsive to the derived control signal for deflecting the cathode-ray beam of the tube in one direction. There is also derived from the received carrier signal a second control potential, the amplitude of which varies with the amplitude of the received carrier-signal energy, and the system includes means responsive to the second control signal for modulating the cathode-ray beam of the tube. There is also provided in the system means for deflecting the cathode-ray beam of the tube in a direction normal to the aforesaid one direction in synchronism with cyclic scanning of the aforesaid predetermined space area by the sharply-concentrated beam in a direction normal to the first-mentioned direction of scanning, whereby there is provided an indication in two dimensions of the position in space of the reflector.

For a better understanding of the invention, together with other and further objects thereof, reference is had to the following description taken in connection with the accompanying drawing, and its scope will be pointed out in the appended claims.

Referring now to the drawing, Fig. 1 is a circuit diagram, partly schematic, of a complete system for indicating the position in space of a radiated-signal reflector; and Figs. 2 and 3 comprise graphs which are used in explaining the operation of the arrangement of Fig. 1.

Referring now more particularly to Fig. 1 of the drawing, the system there represented comprises a complete position-indicating system embodying the present invention in its preferred form. The system includes a transmitting station 10 for radiating a sharply-concentrated carrier-signal beam and for causing the beam cyclically to scan a predetermined space area in two directions normal to each other. The system additionally includes a receiving station 11 for receiving carrier-signal energy from the radiated beam reflected from a radiated-signal reflector 12, for example, an aircraft.

The transmitting station 10 is described in detail in applicant's copending application referred to above. Briefly, for purposes of the present description, the transmitting station 10 includes an antenna system 13 comprising a plurality of signal radiators shown as dipoles $D_1$—$D_{16}$, inclusive, geometrically spaced in two dimensions and including means for electrically spacing them in one of the two dimensions. Specifically, the conductors of the dipoles are all disposed in the same horizontal plane and are parallel to each other. Dipoles $D_1$—$D_4$, inclusive, are spaced in a first dimension in a longitudinal array, while the sets of dipoles $D_5$—$D_8$, inclusive, $D_9$—$D_{12}$, inclusive, and $D_{13}$—$D_{16}$, inclusive, are similarly spaced in other longitudinal arrays and are arranged, in the order named, to one side of the set of dipoles $D_1$—$D_4$, inclusive, to form an arrangement of dipole sets, each set including an array of four dipole antennas and the sets being spaced in a second dimension. The dipoles of each of the above-mentioned sets of dipoles are energized in parallel except that the above-mentioned means for electrically spacing them in one of the two dimensions comprises delay networks F interposed between adjacent dipoles. The geometrical spacing of the dipoles of each set in the above-mentioned one dimension is preferably made approximately one-half wave length of the mean or nominal frequency of the carrier signal to be applied to the system, while the electrical spacing due to delay networks F is made to be in integral number of wave lengths at the nominal or mean frequency of the carrier signal. The sets of dipoles are also preferably spaced in the dimension normal to the first dimension, or in the above-mentioned second dimension, by a distance approximately equal to one-half the wave length of the mean or nominal frequency of the carrier signal to be applied to the system.

The transmitting station 10 also includes a source of high-frequency carrier signals comprising a high-frequency oscillator 14 and means for individually applying carrier signals from the oscillator 14 to the signal radiators $D_1$—$D_{16}$, inclusive, for directive radiation effectively in the form of a sharply-concentrated beam, this means comprising a phase shifter 15 for coupling the oscillator 14 through individual phase-shifting networks to the dipole sets $D_1$—$D_4$, inclusive, $D_5$—$D_8$, inclusive, etc. There is also included means for cyclically varying the frequency of the carrier signal of the oscillator 14 to scan a predetermined space in one direction with the sharply-concentrated carrier-signal beam comprising a line-scanning generator 16 which is adapted to be synchronized from a timer 17, the output circuit of the line-scanning generator 16 being coupled to the high-frequency oscillator 14 to vary the output frequency of unit 14 over a predetermined range of frequency deviation in accordance with the wave form of the signal developed by the line-frequency scanning generator 16, in any conventional manner. The transmitting station 10 additionally includes means for cyclically varying the relative phases of the carrier signals as applied to the signal radiators which are spaced in the above-mentioned second dimension at a second predetermined frequency, lower than the line-scanning frequency, to scan the aforementioned predetermined space area in a direction normal to the first-named direction with the carrier-signal beam. This means comprises a field-frequency scanning generator 18, also adapted to be synchronized by the timer 17 and having an output circuit which is coupled to the individual phase-shifting networks of the phase shifter 15 in the manner more fully explained in the aforementioned copending application.

In order to suppress radiation downward from the plane including the conductors of dipoles $D_1$—$D_{16}$, inclusive, a reflecting conductor, not shown, is disposed below each of the dipoles, thus to increase the useful energy in the desired direction of radiation and minimize minor spurious beams.

The carrier-signal receiver 11 includes a radio-frequency amplifier and modulator 19 having an input circuit coupled to a substantially nondirectional antenna system provided by two dipole antennas 20, 21, antenna 20 preferably being parallel to the dipoles of the antenna system 13 of the transmitting station and the dipole antenna 20 being at right angles to the dipole 21 to provide a response to reflected carrier signals having a polarization 90 degrees displaced from that radiated by the antenna 13.

The modulator of unit 19 has an input circuit coupled to an oscillation generator 22, for converting received carrier signals to intermediate-frequency carrier signals, and has an output circuit to which is coupled, in the order named, an intermediate-frequency amplifier 23 of one or more stages, a limiting system 24, a frequency detector 25, a direct-current amplifier 26 of one or more stages, and a first set of deflecting electrodes 27 provided in a cathode-ray tube 28. Also coupled to the output of the limiting system 24 is an amplitude detector and amplifier 29, the output circuit of which is coupled through a source of biasing potential 30 to a control electrode 31 and cathode 32 provided in the cathode-ray tube 28. The biasing source 30 biases the cathode-ray tube 28 to cutoff in the absence of a received carrier signal. The cathode-ray tube 28 also includes a second set of deflecting electrodes 33 arranged at right angles to the deflecting electrodes 27 and coupled to an output circuit of the field-scanning generator 18 of the transmitting station 10.

Considering now the operation of the system just described, and referring to the curves of Figs. 2 and 3, the detailed operation of the transmitting station 10 is described in the aforementioned copending application. Its operation, briefly stated in sufficient detail for purposes of the present description of the operation of the system, is as follows: The line-frequency scanning generator 16 and field-frequency scanning generator 18 generate control signals preferably of saw-tooth wave forms. The control signal of unit 16 frequency-modulates the carrier-signal generated by the high-frequency oscillator 14, whereby the frequency of the latter deviates linearly with time between a lower frequency $f_1$ and a higher frequency $f_2$, as represented by curve A of Fig. 3a. The control signal of unit 18 varies linearly with time the relative phases of the carrier signals applied to the sets of dipoles $D_1$—$D_4$, inclusive, $D_5$—$D_8$, inclusive, etc., the frequency of this control signal being preferably much lower than that generated by unit 16. There is thus radiated by the antenna system 13 a sharply-concentrated carrier-signal beam, represented by curve B, Fig. 2, which cyclically sweeps across the scanned space area at a substantially constant angular velocity from a low angle of radiation $\theta$, corresponding to the frequency $f_1$ of unit 14, to a high angle of radiation $\theta_1$, corresponding to the mean or nominal frequency of the carrier signal of unit 14, and continuing on to a low angle of radiation $\theta_2$, corresponding to the higher frequency $f_2$ of the carrier signal of unit 14. Each value of frequency of the carrier signal of unit 14 thus corresponds to an individual angle of radiation of the sharply-concentrated carrier-signal beam. The beam is simultaneously caused to scan the scanned space area at a constant angular velocity but at a lower cyclic frequency and in a direction normal to that described in connection with Fig. 2; that is, in the aforementioned second dimension. This is effected by the action of the field-frequency scanning generator 18 in controlling through the phase shifter 15 the relative phases of the carrier signals applied to the sets of dipoles $D_1$—$D_4$, inclusive, $D_5$—$D_8$, inclusive, etc. The angle of radiation in the second dimension thus varies with the values of the control signal of unit 18.

Assume now that the carrier-signal beam is radiated at a given instant at an angle of radiation $\phi$, as represented by curve B, Fig. 2, which angle corresponds to a frequency $f_3$ of the carrier signal generated by unit 14, and that after being radiated it travels to the radiated-signal reflector 12 and is reflected back to the receiving station 11. The reflected carrier wave is received and amplified by the radio-frequency amplifier of unit 19 and is converted to an intermediate-frequency carrier wave by the oscillation generator 22 and modulator of unit 19. The intermediate-frequency carrier signal developed in the output circuit of the modulator of unit 19 is amplified by the intermediate-frequency amplifier 23, is limited to a predetermined substantially constant amplitude by the limiting system 24 and applied to the frequency detector 25. The frequency-response characteristic of unit 25 is represented by curve C, Fig. 3b, and hence there is developed in the output of unit 25 a unidirectional potential or control signal having an amplitude $e_3$. This potential is amplified by the direct-current amplifier 26 and applied to the deflecting electrodes 27 of the cathode-ray tube 28.

The amplitude-limited intermediate-frequency carrier signal developed in the output circuit of the limiting system 24 is also applied to the amplitude detector of unit 29 to derive a second control signal which is amplified by the amplifier of unit 29 and applied between the control electrode 31 and cathode 32 of tube 28, the control signal being applied with polarity opposite to that of the biasing source 30 thus to bias tube 28 above cut-off and permitting a cathode-ray beam to be formed and directed toward the fluorescent screen of tube 28.

The control signal developed in the output circuit of the field-frequency scanning generator 18 of the transmitting station 10 is applied to the deflecting electrodes 33 of vacuum tube 28, whereby there is applied to these electrodes a potential which varies in synchronism with the angle of radiation of the sharply-concentrated carrier-signal beam in the aforementioned second dimension, that is, in a direction transverse to the direction of alignment of the dipoles $D_1$—$D_4$, inclusive, of the antenna system 13.

Consequently, the cathode-ray beam developed in the cathode-ray tube 28 due to the application of the second-named control signal between the electrodes 31, 32 thereof travels between the electrodes 33 and is deflected in one direction in accordance with the instantaneous potential applied to these electrodes, which potential, as previously pointed out, varies with the angle of radiation of the carrier-signal beam B in the second dimension. The cathode-ray beam continues through the deflecting electrodes 27 and is again deflected in a direction, normal to the direction of its first deflection, due to the instantaneous potential $e_3$ applied to the latter deflecting electrodes, the value of this potential corresponding to the angle of radiation $\phi$ which the carrier-signal beam B had when it started its travel toward the reflector 12. The cathode-ray beam thus strikes the fluorescent screen of tube 28 at a point which indicates in two dimensions the position of the reflector 12 with respect to the location of the receiving station 11.

It may be noted at this point that the angle of radiation of the sharply-concentrated carrier-signal beam from the antenna system 13 may have changed to a new value $\phi_2$, as represented by broken-line curve E, in the first dimension at the time the reflected carrier signal is received at the antenna system 20, 21 of the receiving station 11. This is due to the relatively rapidly changing angles of radiation of the beam in the first dimension by virtue of the relatively high line-scanning frequency employed and the time required for the radiated beam B to travel to the reflector 12 and back to the antenna system 20, 21.

In the aforementioned copending application, the deflecting electrodes 27 of the cathode-ray tube 28 are energized by the control signal developed in the output circuit of unit 16, rather than from the output of the direct-current amplifier 26 of the present invention, and it is thus necessary in that arrangement to introduce in circuit with the deflecting electrodes 27 a compensating potential the magnitude of which varies with the time required for the radiated carrier signal to travel to the reflector 12 and to return to the receiving station 11. Such compensating potential is apt to introduce spurious indications near the outer edges of the scanned space area due to the initiation of a new scanning line on the cathode-ray tube 28 prior to the time when the reflected carrier signal is received by the receiving station 11.

The present invention avoids the necessity for such compensating potentials and the spurious indications consequent upon their use. This results from the fact that the deflections of the cathode-ray beam of tube 28 vary only in accordance with the first control signal applied to the deflecting electrodes 27 and the second control applied to the deflecting electrodes 33. The latter control signal varies in synchronism with the changing angles of radiation of the carrier-signal beam from antenna 13 in the second dimension and, since the change in the angle of radiation in this dimension is relatively slow, the time delay of transmission of the carrier signal to the reflector 12 and back to the receiving station 11 is of no importance. The first control potential, applied to the deflecting electrodes 27, varies in amplitude only with the frequency of the received carrier signal and, since each frequency of the received carrier signal corresponds to a particular angle of radiation of the carrier-signal beam from the antenna system 13 in the first dimension, the deflection of the cathode-ray beam by the deflecting electrodes 27 varies directly with the angle at which the carrier-signal beam was radiated from the antenna 13 to the reflector 12. Thus, if the reflection of the carrier signal occurs near an outer edge of the scanned space area, as at an angle of radiation $\theta$ corresponding to the frequency $f_1$ of the carrier signal of unit 14, the control signal applied to the deflecting electrodes 27 of tube 28 has a value, for example, the value $e_1$, corresponding only to this angle of radiation. Similarly, if reflection of the carrier signal occurs at the opposite edge of the scanned space area, as at an angle of radiation $\theta_2$ corresponding to the frequency $f_2$ of the carrier signal of unit 14, the control signal applied to the deflecting electrodes 27 of tube 28 again has a value, for example, the value $e_2$, individual to the latter angle of radiation. Consequently, the indications provided by the cathode-ray tube 28 of the position in space of the reflector 12 are free from any ambiguity over all portions of the scanned space area.

From the above described operation of the invention, it will be evident that the antenna system 20, 21 and the units 19 and 22 to 26, inclusive, of the receiving station 11 comprise means for receiving carrier-signal energy from the radiated beam of antenna 13 reflected from the reflector 12 and means responsive solely to the received carrier-signal energy for deriving therefrom a control signal a characteristic of which varies with the frequency of the received carrier-signal energy. Further it will be evident that units 25 and 29 comprise means responsive solely to the received carrier-signal energy for deriving two control signals a characteristic of one of which, for example, that derived by unit 25, varies with the frequency of the received carrier-signal energy, and a characteristic of the other of which, for example, that derived by unit 29, varies with the amplitude of the received carrier-signal energy. The cathode-ray tube 28 comprises means responsive to the two control signals derived by units 25 and 29 for indicating the position in space of the reflector 12.

The electrodes 31 and 32 of tube 28 comprise means responsive to the control signal derived by unit 29 for modulating the cathode-ray beam of the tube 28.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for locating a radiated-signal reflector comprising, an antenna system having a radiation characteristic effectively in the form of a sharply-concentrated beam, means for applying a carrier signal to said antenna system, means for varying the frequency of said carrier signal and for scanning a predetermined space in at least one direction with said beam synchronously with said frequency variation, means for receiving carrier-signal energy from said radiated beam reflected from said reflector, means responsive solely to said received carrier-signal energy for deriving therefrom a control signal a characteristic of which varies with the frequency of said received carrier-signal energy, and means responsive to said control signal and dependent upon the said characteristic thereof for indicating the position in space of said reflector.

2. A system for locating a radiated-signal reflector comprising, an antenna system having a radiation characteristic effectively in the form of a sharply-concentrated beam, means for applying a carrier signal to said antenna system, means for varying the frequency of said carrier signal and for scanning a predetermined space in at least one direction with said beam synchronously with said frequency variation, means for receiving carrier-signal energy from said radiated beam reflected from said reflector, means responsive solely to said received carrier-signal energy for deriving therefrom a control signal the amplitude of which varies with the frequency of said received carrier-signal energy, and means responsive to said control signal and dependent upon the amplitude thereof for indicating the position in space of said reflector.

3. A system for locating a radiated-signal reflector comprising, an antenna system having a radiation characteristic effectively in the form of a sharply-concentrated beam, means for applying a carrier signal to said antenna system, means for varying the frequency of said carrier signal and for scanning a predetermined space in at least one direction with said beam synchronously with said frequency variation, means for receiving carrier-signal energy from said radiated beam reflected from said reflector, means for frequency-detecting said received carrier signal to derive a control signal a charactistic of which varies with the frequency of said received carrier signal, and means responsive to said control signal and dependent upon the said characteristic thereof for indicating the position in space of said reflector.

4. A system for locating a radiated-signal reflector comprising, an antenna system having a radiation characteristic effectively in the form of a sharply-concentrated beam, means for applying a carrier signal to said antenna system, means for varying the frequency of said carrier signal and for scanning a predetermined space in at least one direction with said beam synchronously with said frequency variation, means for receiving carrier-signal energy from said radiated beam reflected from said reflector, means responsive solely to said received carrier-signal energy for deriving two control signals a characteristic of one of which varies with the frequency of said received carrier-signal energy and a characteristic of the other of which varies with the amplitude of said received carrier-signal energy, and means responsive to said control signals and dependent upon the said characteristics thereof for indicating the position in space of said reflector.

5. A system for locating a radiated-signal reflector comprising, an antenna system having a radiation characteristic effectively in the form of a sharply-concentrated beam, means for applying a carrier signal to said antenna system, means for cyclically varying the frequency of said carrier signal and for scanning a predetermined space in at least one direction with said beam synchronously with said frequency variation, a cathode-ray tube, means for receiving carrier-signal energy from said radiated beam reflected from said reflector, means responsive solely to said received carrier-signal energy for deriving a control signal a characteristic of which varies with the frequency of said received carrier-signal energy, and means responsive to said control signal and dependent upon the said characteristic thereof for deflecting the cathode-ray beam of said tube in one direction to indicate the position in space of said reflector.

6. A system for locating a radiated-signal reflector comprising, an antenna system having a radiation characteristic effectively in the form of a sharply-concentrated beam, means for applying a carrier signal to said antenna system, means for cyclically varying the frequency of said carrier signal and for scanning a predetermined space in at least one direction with said beam synchronously with said frequency variation, means for receiving carrier-signal energy from said radiated beam reflected from said reflector, means responsive solely to said received carrier-signal energy for deriving two control signals a characteristic of one of which varies with the frequency of said received carrier-signal energy and a characteristic of the other of which varies with the amplitude of said received carrier-signal energy, a cathode-ray tube, means responsive to said one control signal and dependent upon the said characteristic thereof for deflecting the cathode-ray beam of said tube in one direction, and means responsive to said other control signal and dependent upon the said characteristic thereof for modulating the cathode-ray beam of said tube, thereby to indicate the position in space of said reflector.

7. A system for locating a radiated-signal reflector comprising, an antenna system including a plurality of signal radiators geometrically spaced in two dimensions and means for electrically spacing said radiators in one of said two dimensions so that said antenna system is responsive to variations in applied carrier-signal frequency to cause a sharply-concentrated radiated beam to scan a predetermined space in one direction and responsive to variation of the relative phases of carrier signals applied to said radiators which are spaced in the other of said dimensions to scan said predetermined space with said beam in a direction normal to said first scanning direction, a source of high-frequency carrier signals, means for individually applying carrier signals from said source to said signal radiators, means for cyclically varying the frequency of the carrier signal of said source, means for cyclically varying the relative phases of the carrier signals as applied to said radiators which are spaced in the other of said dimensions, means for receiving carrier-signal energy from said radiated beam reflected from said reflector, means responsive solely to said received carrier-signal energy for deriving therefrom a control signal a characteristic of which varies with the frequency of said received carrier-signal energy, a cathode-ray tube, means responsive to said control signal and dependent upon the said characteristic thereof for deflecting the cathode-ray beam of said tube in one direction, and means for deflecting the cathode-ray beam of said tube in a direction normal to said one direction in synchronism with said cyclic variations of relative phase, thereby to indicate in two dimensions the position in space of said reflector.

8. A system for locating a radiated-signal reflector comprising, an antenna system including a plurality of signal radiators geometrically spaced in two dimensions and means for electrically spacing said radiators in one of said two dimensions so that said antenna system is responsive to variations in applied carrier-signal frequency to cause a sharply-concentrated radiated beam to scan a predetermined space in one direction and responsive to variation of the relative phases of carrier signals applied to said radiators which are spaced in the other of said dimensions to scan said predetermined space with said beam in a direction normal to said first scanning direction, a source of high-frequency carrier signals, means for individually applying carrier signals from said source to said signal radiators, means for cyclically varying the frequency of the carrier signal of said source, means for cyclically varying the relative phase of the carrier signals as applied to said radiators which are spaced in the other of said dimensions, means for receiving carrier-signal energy from said radiated beam reflected from said reflector, means responsive solely to said received carrier-signal energy for deriving two control signals a characteristic of one of which varies with the frequency of said received carrier-signal energy and a characteristic of the other of which varies with the amplitude of said received carrier-signal energy, a cathode-ray tube, means responsive to said one control signal and dependent upon the said characteristic thereof for deflecting the cathode-ray beam of said tube in one direction, means for deflecting the cathode-ray beam of said tube in a direction normal to said one direction in synchronism with said cyclic relative phase variations, and means responsive to said other control signal and dependent upon the said characteristic thereof for modulating the cathode-ray beam of said tube, thereby to indicate in two dimensions the position in space of said reflector.

ARTHUR V. LOUGHREN.